United States Patent [19]

Jalan

[11] 4,202,934

[45] May 13, 1980

[54] NOBLE METAL/VANADIUM ALLOY CATALYST AND METHOD FOR MAKING

[75] Inventor: Vinod M. Jalan, Manchester, Conn.

[73] Assignee: United Technologies Corporation, Hartford, Conn.

[21] Appl. No.: 922,005

[22] Filed: Jul. 3, 1978

[51] Int. Cl.$^2$ .............................................. H01M 4/86
[52] U.S. Cl. ........................................ 429/40; 429/44; 429/46; 252/425.3; 252/472; 75/134 V; 75/172 R
[58] Field of Search .................... 429/40, 42, 44, 46; 75/0.5 AB, 134 V, 172 E, 172 R; 252/461, 472, 477 Q, 425.3

[56] References Cited

U.S. PATENT DOCUMENTS

| | | | |
|---|---|---|---|
| 3,475,224 | 10/1969 | Adlhart et al. | 429/40 X |
| 3,525,702 | 8/1970 | Sturm et al. | 429/40 X |
| 3,615,836 | 10/1971 | Batzold | 429/44 |
| 4,127,468 | 11/1978 | Alfenaar et al. | 429/44 X |
| 4,145,314 | 3/1979 | Fung et al. | 429/40 |

*Primary Examiner*—Anthony Skapars
*Attorney, Agent, or Firm*—Stephen E. Revis

[57] ABSTRACT

A novel catalyst comprises an alloy of a noble metal and vanadium. The catalyst is particularly useful in an electrochemical cell cathode electrode. The method for making the alloy involves reacting a vanadium compound with sodium dithionite to form a sol of a finely dispersed vanadium sulfite complex, and then reacting noble metal particles with the complex in a reducing environment.

28 Claims, No Drawings

NOBLE METAL/VANADIUM ALLOY CATALYST AND METHOD FOR MAKING

BACKGROUND OF THE INVENTION

1. Field of the Invention

The present invention relates to the production of noble metal alloy catalysts for use in fuel cell electrodes and other catalytic structures.

2. Description of the Prior Art

A fuel cell is a device which converts the energy of a chemical reaction between a fuel and oxidant directly into low voltage, direct current electricity. The problems encountered in obtaining an efficient fuel cell are essentially those of chemical kinetics. It is necessary that the reactions of the fuel and oxidant occur in such manner that the amount of energy degraded into heat is as small as possible. At the same time, the reaction rate of the cell must be high enough to produce economically sufficient current from a cell of practical size. For this reason it is customary to incorporate catalysts in the fuel cell which accelerate the reactions occurring at the electrodes. Each electrode is typically comprised of a substrate (such as wetproofed paper made from graphitized carbon fibers) with a layer of catalyst disposed on the surface which faces the electrolyte.

A typical fuel cell comprises a fuel electrode or anode, an oxidant electrode or cathode, an electrolyte positioned between the electrodes and means to introduce fuel and oxidant to their respective electrodes.

In operation, the fuel (commonly hydrogen) is fed to the anode where it is oxidized at a catalytic surface in the presence of electrolyte with the liberation of electrons. Simultaneously oxygen (or air) is fed to the cathode where it is reduced at a catalytic surface in the presence of electrolyte with the consumption of electrons. The electrons generated at the anode are conducted to the cathode through wires external to the cell and constitute a flow of electrical current which can be made to perform useful work.

To obtain fuel cells which are practical on a commercial scale, a great deal of research has been carried out in an effort to find improved catalysts. For example, the prior art has demonstrated that the activity per unit mass of a catalyst, usually a noble metal, can be enhanced by supporting it in the form of finely divided particles, upon either metallic or carbonaceous base materials of high surface area. The approach has proved especially useful in fuel cell applications utilizing acid electrolytes, for example, where particulate platinum is highly dispersed on a conductive support material such as carbon black and the platinum-covered carbon black, mixed with a suitable bonding agent, is applied as a thin layer on a conductive carbon paper or cloth to form an electrode.

In addition, the prior art has demonstrated that certain unsupported noble metal alloy catalysts exhibit increased catalytic activity and/or increased resistance to sintering and dissolution in fuel cells and other electrochemical and chemical processes when compared to the performance of the unalloyed noble metal catalyst. For example, U.S. Pat. No. 3,506,494 describes a method for producing a ternary alloy for use at the anode of a fuel cell. The ternary alloy consists of platinum, ruthenium and a metal selected from the following: gold, rhenium, tantalum, tungsten, molybdenum, silver, rhodium, osmium, or iridium. Although it states in column 3, at lines 67-70, that the alloy catalysts may be dispersed on a high surface area carrier such as carbon powder, no method is taught for doing this.

U.S. Pat. No. 3,428,490 describes another method for making a fuel cell anode electrode. In this case unsupported platinum is alloyed with aluminum and applied to an electrode substrate. The aluminum is then leached out to the extent possible to form the finished electrode. The removal of the aluminum produces a large number of reaction sites or voids in the electrode. It is stated that the voids increase the surface area and thus the activity of the catalyst. Although this patent indicates in column 6 at lines 26-29 that some aluminum may still be present in the electrode composition after leaching, it is believed that the amount remaining is not significant and it would be present only in those areas which could not be reached by the leaching solution. The patent teaches no method for making a noble metal-aluminum alloy which is supported.

Other patents of more general interest which relate to noble metal alloy catalysts are U.S. Pat. Nos. 3,340,097 (platinum-tin-ruthenium); 3,615,836; and British Pat. No. 1,074,862. The British patent describes an unsupported noble metal ternary alloy wherein one of the metals in the alloy may be vanadium. Its suggested use is as an anode catalyst in the electrochemical combustion of methanol.

It is known that some alloys may be made by co-reducing intimate mixtures of reduceable metal salts. For example, the method of co-reducing metal salts in the presence of a support material is used to make a supported, finely divided platinum-iron alloy as explained in an article by C. Bartholomew and M. Boudart titled "Preparation of a Well Dispersed Platinum-Iron Alloy on Carbon" from the *Journal of Catalysis*, pp. 173-176, V25, #1, April 1972. However, salts of certain metals are not readily reduced. Such metals are those which form refractory metal oxides, e.g., Ti, Ce, Mg, Al, Si, and Ca.

It is apparent from the foregoing that there is still no commercially viable process for preparing high surface area catalysts of noble metals alloyed with the metallic component of a refractory metal oxide. It has been observed, however, that platinum and other noble metals and noble metal alloys, in bulk form, react with many refractory metal oxides at high temperatures to form solid solution alloys or intermetallic alloy compounds and that these reactions are accelerated by the presence of reducing agents in the high temperature environment of, for example, carbon, hydrogen, carbon monoxide and certain organic vapors. "Platinum Metals Review 20," No. 3, p. 79, July 1976.

Finally, returning to the subject of fuel cells, all base metals, including the refractory metals, are notoriously susceptible to oxidation and dissolution at cathodes in acid fuel cells, and it is not believed that alloys of noble metals with base metals have ever been considered for use at cathodes for that very reason, whether supported or unsupported.

As used herein, "noble metals" refers to those metals of the second and third triads of Group VIII of the Periodic Table, also referred to as the palladium and platinum groups, respectively. These metals are ruthenium, rhodium, palladium and osmium, iridium and platinum.

SUMMARY OF THE INVENTION

One object of the present invention is a novel noble metal alloy.

Another object of the present invention is a noble metal alloy catalyst with increased activity.

Yet another object of the present invention is an improved cathode electrode for electrochemical cells.

A further object of the present invention is to provide a process for preparing high activity catalysts which are alloys of a noble metal and vanadium.

In the following discussion of this invention and in the appended claims, when catalytic activity comparisons are made they are intended to be comparisons of mass activity. Mass activity is an arbitrarily defined measure of the effectiveness of a catalyst per unit weight of the catalytic material. In the case of fuel cells with phosphoric acid as electrolyte we define the mass activity of the cathode catalyst (in mA/mg) as the maximum current available due to oxygen reduction at 0.900 volts, the potential being measured relative to an unpolarized $H_2/Pt$ reference electrode at the same temperature and pressure in the same electrolyte. A greater mass activity can be achieved by either increasing the surface area of the catalyst (e.g., by reducing the particle size) or by increasing its specific activity. Specific activity is defined as the $O_2$ reduction current, as specified above, which is available per unit surface area of the noble metal (i.e., $\mu A/cm^2$). The greater mass activity of the alloy of the present invention (in comparison to the mass activity of the unalloyed noble metal) is attained through improvement in the specific activity of the catalytic material in comparison to the specific activity of the unalloyed noble metal.

In the process of the present invention an aqueous solution of a vanadium compound is reacted with $Na_2S_2O_4$ (sodium dithionite) to provide a sol of a finely dispersed vanadium sulfite complex. This vanadium complex, when reduced in the presence of a finely divided noble metal, readily forms a finely divided alloy of the noble metal and vanadium. This noble metal-vanadium alloy provides a more efficient or active catalyst at cathodes in acid fuel cells than the noble metal catalyst in unalloyed form.

Two commonly owned copending applications filed on even date herewith disclose a method for making a variety of noble metal-base metal alloys which also have higher catalytic activity (i.e., mass activity) than the catalytic activity of the unalloyed noble metal. These applications are U.S. Ser. No. 922,004, filed July 3, 1978, now U.S. Pat. No. 4,186,110, issued Jan. 29, 1980 titled "Noble Metal-Refractory Metal Alloys and Method for Making" by V. Jalan and D. Landsman and U.S. Ser. No. 922,003, filed July 3, 1978, now U.S. Pat. No. 4,192,907, issued Mar. 11, 1980 titled "Electrochemical Cell electrodes Incorporating Noble Metal-Base Metal Alloy Catalysts" by V. Jalan, D. Landsman, and J. Lee. As with the method of the present invention, the increased activity is due to increased specific activity which more than compensates for a loss in surface area which occurs during the process. It states in these copending applications that, theoretically, any base metal can be alloyed with a noble metal according to the method disclosed therein and will have increased catalytic activity for the reduction of oxygen as compared to the unalloyed noble metal, as long as the base metal is available in the form of a finely divided (i.e., submicron size) metal oxide. Vanadium is not available as such and no method is known for obtaining such a material. Until such material is obtainable, the method of these copending applications cannot produce a noble metal-vanadium alloy without an unacceptable loss in surface area which cannot be compensated by the increased specific catalytic activity of the noble metal-vanadium alloy over the specific catalytic activity of the unalloyed noble metal.

The present method yields a noble metal-vanadium alloy whose increased specific activity for the reduction of oxygen does compensate for the loss in surface area. More particularly, we have made a supported platinum-vanadium alloy catalyst by the method of the present invention which has an initial catalytic mass activity which is, surprisingly, at least two and one half times that of supported unalloyed platinum. Additionally, and quite surprisingly, the activity of this platinum-vanadium alloy is significantly higher than the activity of platinum alloyed with any other base metal which we have tried, such as those platinum-base metal alloys described in the examples of the hereinabove referenced copending applications by Jalan et al.

Returning to the particulars of the present method, preferably the reaction is effected by intimately contacting finely divided noble metal particles with the said vanadium complex and heating to a sufficiently high temperature (preferably in a reducing environment) to thermocatalytically reduce the vanadium complex and simultaneously form an alloy containing the noble metal and vanadium. The preferred use of this alloy is as a catalyst for a fuel cell cathode electrode. Although during the process there is generally a loss in the unalloyed noble metal surface area due to thermal sintering, this loss in surface area is more than compensated by the increased specific activity of the resulting alloy.

The method is equally well suited to making unsupported as well as supported alloys. However, since finely divided unsupported noble metals are limited, generally, to less than 50 $m^2/g$ of noble metal, this method is best practiced by using supported finely divided noble metals, which can be prepared in surface areas, generally, greater than 100 $m^2/g$ of noble metal. In any event, the novel resulting product of the present method is a supported or unsupported finely divided alloy of a noble metal and vanadium having significantly enhanced overall catalytic activity relative to the supported or unsupported, respectively, unalloyed noble metal. Preferred alloys of the present invention have surface areas greater than 30 $m^2/g$ of noble metal; the most preferred alloys have surface areas greater than 50 $m^2/g$ of noble metal. Platinum is the preferred noble metal when the alloy is to be used as a catalyst in phosphoric acid fuel cells.

The alloys of this invention may find application not only as catalysts in fuel cell electrodes but also as catalysts in the chemical, pharmaceutical, automotive and anti-pollution fields. They may also have usefulness for non-catalytic applications and, therefore, the scope of the present invention is not intended to be limited to the use of these alloys as catalysts. By proper selection of the noble metal and the amount of vanadium the alloy can be tailored to suit particular service conditions. The word "alloy" as used above and hereinafter in the specification and claims is intended to encompass within its meaning solid solutions and intermetallic compounds of the metals being combined.

The foregoing and other advantages and objects of the present invention will become more fully apparent

DESCRIPTION OF THE PREFERRED EMBODIMENTS

In accordance with a preferred embodiment of the present invention, supported unalloyed noble metal catalysts in the form of finely-divided particles dispersed uniformly over the surface of a suitable support material are utilized. This form of the catalyst provides a high surface area, high activity catalytic structure, especially when the support material also is characterized by high surface area. It is to be understood that "unalloyed noble metal catalysts" includes not only the noble metals discussed hereinbefore in elemental form but also mixtures or alloys of one noble metal with another. Other metals not in the second and third triads of Group VIII of the Periodic Table are excluded. In general, the support material provides bulk to the catalyst making it practical to fabricate structures containing very small quantities of the noble metal while allowing attainment of much higher surface areas (and thus higher catalytic activity per unit mass of noble metal) than are achievable with the unsupported noble metal, or are achievable with an unsupported noble metal alloy.

A variety of materials (e.g., silica and alumina) are used as supports for noble metal catalysts in industry. The usual criterion for selecting a material for use as a support is that it be chemically stable in the environment in which the catalyst operates. For electrochemical applications the support material should also be electrically conductive and materials such as carbon, graphite or metals are commonly used. The characteristics required of a successful support material are well known or can be easily determined by those skilled in the art for a particular chemical or electrochemical service application.

An example of a preferred support unalloyed noble metal catalyst of the type described above which has found use in electrodes for fuel cells employing a phosphoric acid electrolyte is a conductive carbon black such as acetylene black (Shawinigan Acetylene Black made by Gulf Oil Canada Limited) having finely-divided particles of platinum uniformly dispersed over its surface. Techniques for providing the uniform dispersion of finely divided platinum particles on the acetylene black and other support materials are well known in the art and are not considered to be part of the novel aspects of the present invention. Carbon is a preferred support material for many fuel cell applications. Some types of carbons other than carbon black which may be used are graphite, partially graphitized carbon, pyrocarbon and glassy carbons.

The method of the invention is particularly advantageous since it now provides means for significantly enhancing the catalytic activity for the reduction of oxygen of a supported unalloyed noble metal catalyst. The invention is further advantageous since the specificity, resistance to sintering, electronic and other physical properties of the catalyst can be tailored to particular service applications by the proper selection of the noble metal and the amount of vanadium.

According to the method of the present invention an aqueous solution of vanadium compound is reacted with sodium dithionite solution (preferably in the presence of a small quantity of $H_2O_2$) to provide a clear dark sol of a finely dispersed vanadium sulfite complex. When intimately mixed with an aqueous dispersion of high surface area supported noble metal catalyst the said vanadium complex is adsorbed on the catalyst support material in appreciable quantity. The entire process is preferably carried out at low temperature for controlled and slow formation of the vanadium complex. The vanadium complex-impregnated catalyst is then filtered and dried. The resulting product is an intimate mixture of noble metal particles and fine vanadium complex particles both supported on the support material of the original unalloyed noble metal. Further details of this technique are provided in an example set forth below for purposes of illustration.

The intimate mixture of supported catalyst and the vanadium complex is then heated to a sufficiently high temperature that the vanadium complex is reduced by the combination of temperature and proximity to the noble metal particles, whereby the metallic component of the vanadium complex forms a solid solution or intermetallic compound with the noble metal (i.e., an alloy). Typically, the intimate mixture must be heated to at least about 600° C., preferably 800°–1000° C., to achieve the desired reaction. Of course, the time at temperature must be sufficient to complete the reaction and will vary with the amount of vanadium complex used, times of 1–16 hours generally being satisfactory in this regard. The heating is usually conducted in a reducing atmosphere to accelerate the reaction, but an inert atmosphere or vacuum may be used in certain instances where a reducing environment is present, such as where the support material is carbon and the carbon provides a locally reducing environment for the reaction. Some thermal sintering of the noble metal usually occurs during the heat treatment, but results have indicated that the loss is relatively insubstantial when the significantly increased specific activity or improved performance of the resulting alloy catalyst at the cathode of a fuel cell is considered.

It is believed that $Na_2S_2O_4$ reacts with vanadium $(V^{+5})$ in solution to give a vanadium $(V^{+3})$ sulfite complex (*Australian Journal of Chemistry*, Vol. 29, No. 11, pp. 2389–93, 1976) that adsorbs on the catalyst support. It is felt that low temperature and use of $H_2O_2$ reduce the rates of this reaction to yield a uniform distribution of the vanadium complex on the catalyst support. Note that in the case where unsupported finely divided noble metal catalyst is used, the vanadium complex will deposit directly on the noble metal catalyst particles. It is further believed that during the heat treatment step, the sulfite complex of vanadium $(V^{+3})$ decomposes to $V_2O_3$ and then, at higher temperatures it reacts with the noble metal crystallites to give an alloy of the noble metal and vanadium.

An example of a preferred aqueous solution of vanadium compound is a solution of $V_2O_5$ in NaOH. However, othe aqueous solutions of vanadium compounds such as sodium vanadate, ammonium-meta vanadate, vanadyl sulfate, etc. may be used.

In the foregoing description the precursor noble metal is a supported noble metal and one step in the process involves putting the vanadium complex particles on the support with the noble metal particles. For the purpose of the present invention it does not actually matter how these two types of particles arrive on the support material. For example, unsupported noble metal particles and the vanadium complex particles could be co-deposited onto the support material, or the vanadium complex particles could be first deposited on the bare catalyst support and finely divided noble metal particles may then be deposited on the support. It is important, however, that both types of particles be finely divided and uniformly dispersed over the surface of the support.

The most effective amount of vanadium in the alloys of the present invention will vary depending upon the application to which the alloy is to be put and the materials making up the alloy. As little as one percent and perhaps even less may provide a noticeable increase in cathode catalytic activity. The best proportion can be determined through experimentation. The maximum amount of vanadium is determined by the solubility limits of the vanadium in the noble metal.

The following example is offered to illustrate the process of the invention in more detail, especially as it relates to preparing a supported platinum-vanadium alloy catalyst for use in an acid fuel cell cathode electrode:

One gram of $V_2O_5$ in 250 ml distilled water was dissolved by the addition of 1 N NaOH to bring the pH to 9. The dissolution rate was accelerated by heating the solution. The solution was chilled to 5°–10° C. and 2 ml of 30 volume percent $H_2O_2$ and 15 ml of 4 weight percent $Na_2S_2O_4$ were added. After a few minutes of mixing, the pH of this solution was decreased to about 1.5 by the addition of cold 1 N HCl. This solution had a light yellow, clear appearance that changed to a clear but very dark black-green color (believed to be $V^{+3}$ sulfite complex) upon extended (longer than 30 minutes) stirring.

Meanwhile, in a separate beaker, twenty grams of catalyst consisting of 10% Pt, by weight, supported on Shawinigan Acytelene Black manufactured by Gulf Oil Canada Limited was ultrasonically dispersed in 800 ml distilled water and cooled to 5°–10° C. The surface area of this catalyst was 110 m$^2$/g Pt or greater. The two suspensions were mixed together and stirred for sufficient time (about one hour) for the said $V^{+3}$ sulfite complex to adsorb on the carbon black support in appreciable quantity (about 50 atom percent vanadium based on platinum). The vanadium complex impregnated catalyst was then filtered and dried to obtain an intimate mixture of a highly dispersed vanadium complex and highly dispersed platinum on carbon. The mixture was then heated to 930° C. in flowing $N_2$ (or $H_2$) and held at this temperature for one hour. The product was cooled to room temperature before exposing it to atmospheric air.

X-ray diffraction analysis confirmed the alloying of platinum with vanadium. The Energy Dispersive Analysis by X-ray (EDAX) of individual catalyst particles further substantiated that the catalyst particles consisted of Pt and V. Transmission electron microscopy and electrochemical measurements gave specific surface areas of 56–66 m$^2$/g of platinum in the alloy. The rate of electrochemical sintering of the Pt-V alloy catalyst was found to be lower than that of its precursor. (In 1200 hours of testing in 98% $H_3PO_4$ at 190° C. and at 700 mv potential with respect to an $H_2$ reference electrode, the precursor platinum catalyst lost its surface area from about 110 m$^2$/g Pt to 31 m$^2$/g of Pt while the Pt-V alloy catalyst of this invention lost its surface area from about 60 m$^2$/g of Pt to only 42 m$^2$/g of Pt.)

The resulting catalyst was fabricated into conventional polytetrafluoroethylene bonded cathode electrodes and tested in phosphoric acid fuel cells (98% $H_3PO_4$ at 375° F.) and was found to have an initial activity for the reduction of oxygen at 0.9 volts which was 150–170% higher than that of the 10% platinum, 90% carbon from which it was made (based on equivalent platinum loading).

A comparison of these results and the results obtained using the noble metal alloys of the hereinbefore referenced copending Jalan et al applications demonstrates the superiority of Pt-V alloy as a cathode catalyst. More particularly, in these copending applications the catalyst having the highest cathode activity of those tested was Pt-Al, with an initial activity "only" 110% greater than the unalloyed platinum supported on carbon from which it was made.

Although a principle object of this invention is to provide a noble metal-vanadium alloy cathode catalyst with increased activity, this invention also provides a novel method of preparing highly dispersed vanadium oxide ($V_2O_3$ or $V_2O_5$) on a catalyst support. For this purpose a vanadium compound is reacted with $Na_2S_2O_4$ solution (preferably in the presence of a small quantity of $H_2O_2$) to yield a vanadium ($V^{+3}$) sulfite complex that adsorbs on a catalyst support suitable for the particular application of the catalyst. Upon heating in a vacuum or inert atmosphere, the sulfite complex of vanadium ($V^{+3}$) decomposes to provide a highly dispersed $V_2O_3$ on the support. In the alternative, if the adsorbed vanadium sulfite complex is heated in air the complex decomposes and oxidizes to provide a highly dispersed $V_2O_5$ on the support.

Vanadium pentoxide is a well known catalyst for many chemical reactions. For example, catalysts of vanadium pentoxide supported on alumina have been shown to be highly effective for the selective reduction of $NO_x$ with $NH_3$ to remove highly toxic $NO_x$ from industrial flue gas (*Industrial & Engineering Chemistry Product Research and Development*, Vol. 17, No. 8, p. 117, June 1978).

Although the invention has been shown and described with respect to preferred embodiments thereof, it should be understood by those skilled in the art that other various changes and omissions in the form and detail thereof may be made therein without departing from the spirit and the scope of the invention.

Having thus described typical embodiments of my invention, that which I claim as new and desire to secure by Letters Patent of the United States is:

1. A method for making a finely divided alloy of noble metal and vanadium comprising the steps of:
   reacting an aqueous solution of a vanadium compound with sodium dithionite to form a sol of a finely dispersed vanadium sulfite complex; and
   reacting finely divided unalloyed noble metal particles with said complex by intimately contacting the noble metal particles with the complex and heating to a sufficiently high temperature in at least a locally reducing environment to thermocatalytically reduce said complex and at the same time form a finely divided alloy of the noble metal and vanadium.

2. The method according to claim 1 wherein the step of reacting the vanadium compound with sodium dithionite is done in the presence of $H_2O_2$.

3. The method according to claim 1 wherein said noble metal is platinum.

4. The method according to claim 1 wherein said finely divided noble metal particles are supported and the resulting alloy is supported.

5. The method according to claim 4 wherein said noble metal is platinum.

6. The method according to claim 5 wherein said platinum is supported on carbon.

7. The method according to claim 1 wherein said step of heating includes heating to at least 600° C. to effect the reaction.

8. The method according to claim 1 wherein the temperature is 800°–1000° C.

9. The method of claim 2 wherein intimate contact between the noble metal particles and the vanadium sulfite complex particles is achieved by dispersing said finely divided particles of noble metal in the sol of the said vanadium sulfite complex and then removing the liquids.

10. The method according to claim 4 wherein intimate contact between the supported noble metal particles and the vanadium complex is achieved by dispersing the noble metal covered support material in the sol of the vanadium complex and letting the said vanadium complex absorb on the support material and then drying the solids to produce an intimate mixture of noble metal particles and vanadium complex particles on the support material.

11. The method according to claim 10 wherein the step of reacting an aqueous solution of a vanadium compound with sodium dithionite includes reacting in the presence of $H_2O_2$.

12. The method according to claim 10 wherein said steps of heating includes heating to at least 600° C. to effect the reaction.

13. The method according to claim 11 wherein the temperature is 800°–1000° C.

14. The method according to claim 12 wherein the aqueous solution of vanadium compound is $V_2O_5$ in NaOH.

15. The method according to claim 6 wherein said supported alloy of platinum-vanadium has a surface area of at least 30 $m^2/g$ of platinum in the alloy.

16. In a process involving catalytically reducing oxygen, the step of catalytically reducing oxygen using a catalyst comprising a noble metal-vanadium alloy, said alloy having a catalytic activity for the reduction of oxygen greater than the catalytic activity of the noble metal in unalloyed form.

17. The process according to claim 16 wherein the surface area of the alloy is at least 30 $m^2/g$ of noble metal in the alloy.

18. The process according to claim 17 wherein the alloy is supported.

19. The process according to claim 18 wherein the surface area of the alloy is at least 50 $m^2/g$ of noble metal in the alloy.

20. The process according to claim 17 wherein the noble metal is platinum.

21. The process according to claim 17 or 20 wherein the alloy is supported on carbon.

22. An electrochemical cell comprising a cathode electrode, said electrode including a catalyst comprising a noble metal-vanadium alloy, said alloy having a catalytic activity for the reduction of oxygen greater than the catalytic activity of the noble metal in unalloyed form, said cell including phosphoric acid electrolyte.

23. The cell according to claim 22 wherein said noble metal is platinum and the surface area of the alloy is at least 30 $m^2/g$ of platinum in the alloy.

24. The cell according to claim 22 wherein said alloy is disposed on conductive support particles.

25. The cell according to claim 24 wherein the surface area of said supported alloy is at least 30 $m^2/g$ of noble metal in the alloy.

26. The cell according to claim 25 wherein the noble metal is platinum and the support particles are carbon.

27. The cell according to claim 26 wherein the surface area of the alloy is at least 50 $m^2/g$ of platinum in the alloy.

28. An acid fuel cell including phosphoric acid electrolyte and a cathode electrode, said electrode comprising an electrically conductive substrate and a layer of catalyst disposed on said substrate, said catalyst comprising a platinum-vanadium alloy supported on carbon particles, said alloy having a catalytic activity for the reduction of oxygen greater than the catalytic activity of supported platinum in unalloyed form, and a surface area of at least 30 $m^2/g$ of platinum in the alloy.

* * * * *